US009927016B2

(12) United States Patent
Liu et al.

(10) Patent No.: US 9,927,016 B2
(45) Date of Patent: Mar. 27, 2018

(54) METHOD FOR COLLABORATIVELY CONSTRUCTING COLUMN ENVELOPE PROFILE OF TWO FLANKS OF STAR WHEEL TOOTH (71) Applicant: XI'AN JIAOTONG UNIVERSITY, Xi'an, Shaanxi (CN)

(72) Inventors: Feilong Liu, Shaanxi (CN); Cun Zhao, Shaanxi (CN); Kang Lian, Shaanxi (CN); Quanke Feng, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 258 days.

(21) Appl. No.: 14/783,844

(22) PCT Filed: Mar. 11, 2015

(86) PCT No.: PCT/CN2015/074032
§ 371 (c)(1),
(2) Date: Oct. 9, 2015

(87) PCT Pub. No.: WO2016/041327
PCT Pub. Date: Mar. 24, 2016

(65) Prior Publication Data
US 2016/0230869 A1    Aug. 11, 2016

(30) Foreign Application Priority Data

Sep. 17, 2014   (CN) .......................... 2014 1 0475844

(51) Int. Cl.
*F04C 18/08*    (2006.01)
*F16H 55/08*    (2006.01)
*F04C 18/52*    (2006.01)

(52) U.S. Cl.
CPC ........... *F16H 55/08* (2013.01); *F04C 18/084* (2013.01); *F04C 18/52* (2013.01); *F16H 55/082* (2013.01)

(58) Field of Classification Search
CPC ........ F16H 55/08; F16H 55/082; F04C 18/52; F04C 18/084
See application file for complete search history.

(56) References Cited

U.S. PATENT DOCUMENTS 3,572,023 A  *  3/1971  Galonska ................ B29C 53/12
                                                    28/278
3,971,530 A  *  7/1976  Murvall ................. A01K 89/015
                                                    242/268
4,530,435 A  *  7/1985  Stohlquist ................ B07C 5/32
                                                    198/374

(Continued)

Primary Examiner — Richard Chang (57) ABSTRACT

A method for collaboratively constructing a column envelope profile of two flanks of a star wheel tooth includes steps of: determining a tooth width B of a star wheel according to a diameter of the star wheel and a dimension of a root circle; thereafter, geometrically representing positions and shapes of the two flanks by two base columns having parallel axes and the same diameter; wherein: the axes of the base columns are parallel with a center line of the star wheel tooth; on a section of a tooth top of the star wheel tooth, a local projection of a first base column close to a front flank is projected on a lowermost part of a projection of the front flank; and a local projection of a second base column close to a back flank is projected on an uppermost part of a projection of the back flank.

5 Claims, 5 Drawing Sheets (56) References Cited

U.S. PATENT DOCUMENTS

| | | | | |
|---|---|---|---|---|
| 7,621,411 | B2 * | 11/2009 | Doherty | B65D 41/0478 |
| | | | | 215/228 |
| 8,905,479 | B2 * | 12/2014 | Lehmann | B60N 2/2252 |
| | | | | 297/362 |
| 8,915,548 | B2 * | 12/2014 | Stilleke | B60N 2/2252 |
| | | | | 297/361.1 |
| 9,050,912 | B2 * | 6/2015 | Assmann | B60N 2/2252 |

* cited by examiner

METHOD FOR COLLABORATIVELY CONSTRUCTING COLUMN ENVELOPE PROFILE OF TWO FLANKS OF STAR WHEEL TOOTH

CROSS REFERENCE OF RELATED APPLICATION

This is a U.S. National Stage under 35 U.S.C. 371 of the International Application PCT/2015/074032, filed Mar. 11, 2015, which claims priority under 35 U.S.C. 119(a-d) to CN 201410475844.1, filed Sep. 17, 2014.

BACKGROUND OF THE PRESENT INVENTION

Field of Invention

The present invention relates to a profile structure of a meshing pair of a gear, and more particularly to a method for constructing a profile of two flanks of a star wheel tooth of a single-screw compressor.

Description of Related Arts

Figure 1:
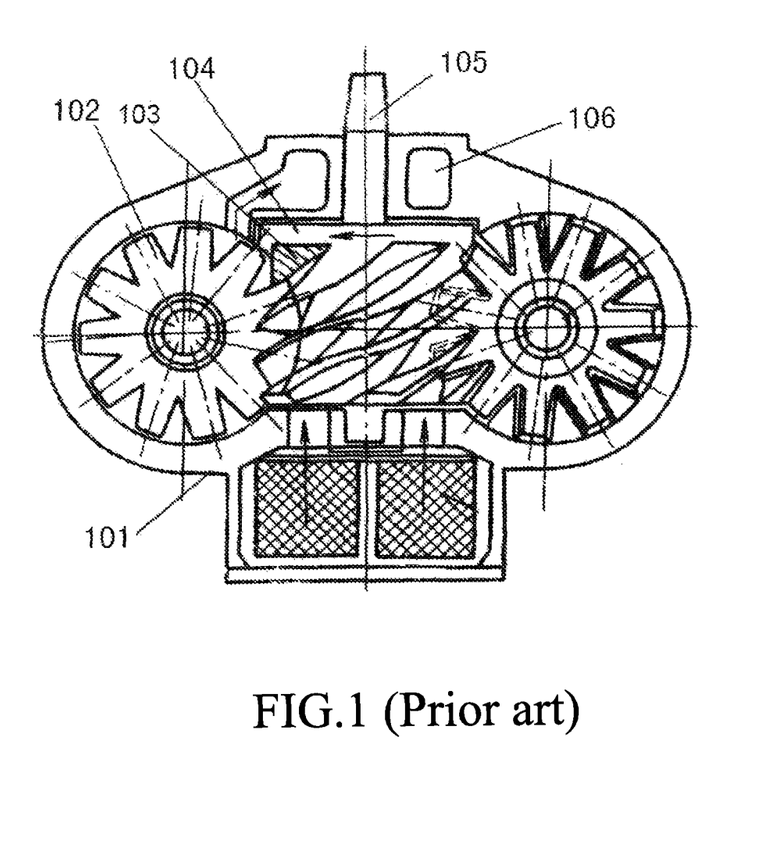
FIG. 1 is a structural sketch view of a single-screw compressor according to prior arts.
Figure 2:
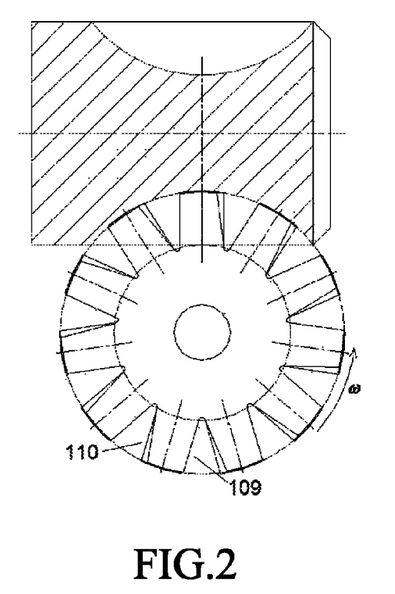
FIG. 2 is a sketch view of a front flank and a back flank of a star wheel tooth of a star wheel according to a preferred embodiment of the present invention.

The single-screw compressor or pump (as showed in FIG. 1), comprising a single-screw rotor, two star wheels and a housing, is recognized as a rotary fluid machinery having an outstanding overall structure performance Since the advent of the single-screw compressor in France in 1960s, multiple single-screw compressors have entered the industrial market. In the major industrial nations in the world, multiple manufacturers have developed and manufactured the single-screw compressors in recent years. The meshing profiles of the star wheel of the single-screw compressor which is available in the market are single-edge line structured, namely that, on the meshing face of the flank of each star wheel tooth, the single edge line stretches from the tooth root to the tooth top along a radial direction. The edge line is the intersection line of two planes having the gradually varied inclined angle. In order to improve the wear-resistance of the profile, the Chinese patent applications, CN200610042414.1 and CN201010293319.X, respectively provide a method for designing a multi-column envelope profile and a method for designing a multi-column non-isometric milling envelope profile. The above two Chinese patent applications merely respectively illustrate that the profile of the front flank of the star wheel tooth is the three-column envelope surface and the profile of the back flank of the star wheel tooth is the three-column envelope surface, and also provide the representation formula of the three columns. However, the above two Chinese patent applications fail to collaboratively consider the profile of the front flank and the back flank of the star wheel tooth, and thus fail to establish the association condition and the association construction upon the mutual restriction and the mutual impact between the profile of the front flank and the back flank of the star wheel tooth. Actually, for the single-screw compressor under the given working condition, if the profile of the front flank and the back flank of the star wheel tooth are designed independently, the liquid film bearing performance between the two flanks of the star wheel tooth may has a great difference, causing the obvious abrasion on one of the two flanks.

SUMMARY OF THE PRESENT INVENTION

A collaborative design of a profile of two flanks of a star wheel tooth is able to accomplish similar forces stressed on two sides of a tooth groove of a screw which cooperates with the star wheel tooth, realize an optimum target that a liquid firm bearing performance of meshing pairs of the two flanks of the star wheel tooth is approximate to or the same with each other, and avoids an abnormal abrasion on one of the two flanks. When processing a profile of the two sides of the tooth groove of the screw, the collaborative design facilitates adjusting tool positions and detecting dimensions of the tooth groove. Moreover, if mutual positions of cylindrical milling cutters for enveloping side walls of the tooth groove of the screw are given according to positions of a column composite profile of the two flanks of the star wheel tooth, the cylindrical milling cutters are able to process the tooth groove of the screw on a specialized screw processing machine, so as to realize a conjugate meshing between the screw and the star wheel.

An object of the present invention is to provide a method for collaboratively constructing a profile of two flanks of a star wheel tooth, for accomplishing sufficient oil film thickness of the two flanks of the star wheel tooth and avoiding a direct contact between materials.

Accordingly, in order to accomplish the above objects, the present invention adopts the following technical solutions.

A method for collaboratively constructing a column envelope profile of two flanks of a star wheel tooth comprises steps of:

determining a tooth width B of a star wheel according to a diameter of the star wheel and a dimension of a root circle; and thereafter, geometrically representing positions and shapes of a front flank and a back flank of all the star wheel teeth of the star wheel by two base columns having parallel axes and the same diameter, wherein the axes of the two base columns are parallel with a center line of the star wheel tooth; the tooth width B, a center distance L of the two base columns, the diameter $d_0$ of the two base columns and an inclined angle $\lambda$ of the flanks of the star wheel tooth at a pitch circle of the star wheel has relationships of:

$$B = d_0 \sin \lambda + L \cos \gamma; \text{ and}$$

$$\gamma = \arcsin\left(\frac{d_0}{L} \cos\lambda\right),$$

wherein $\gamma$ is a horizontal inclined angle of the center distance L of the two base columns.

On a section of a tooth top of the star wheel tooth, a local projection of a first base column which is close to the front flank of the star wheel tooth is on a lowermost part of a projection of the front flank of the star wheel tooth; a local projection of a second base column which is close to the back flank of the star wheel tooth is on an uppermost part of a projection of the back flank of the star wheel tooth.

In the above method, a front sub-column having the same diameter with the base columns is provided above the first base column which is close to the front flank of the star wheel tooth, so as to further represent a construction feature of the front flank of the star wheel tooth. A local projection of the front sub-column is on an upper part of the projection of the front flank of the star wheel tooth. A horizontal inclined angle of a first connecting line between axis centers of the front sub-column and the first base column is 42°-47°. On a section of the tooth root of the star wheel tooth, the local projection of the front sub-column merely has a first point overlapping with an uppermost end of the projection of the front flank of the star wheel tooth.

A back sub-column having the same diameter with the base columns is provided below the second base column which is close to the back flank of the star wheel tooth, so as to further represent a construction feature of the back flank of the star wheel tooth. A local projection of the back sub-column is on a lower part of the projection of the back flank of the star wheel tooth. A horizontal inclined angle of a second connecting line between axis centers of the back sub-column and the second base column is 56°-61°. On the section of the tooth root, the local projection of the back sub-column merely has a second point overlapping with a lowermost end of the projection of the back flank of the star wheel tooth.

Compared with conventional technologies, the present invention, through collaboratively designing the profile of the flanks of the star wheel tooth of the star wheel, is able to obviously decrease and reduce the abnormal abrasion on the flanks of the star wheel tooth and effectively increase a service life of the star wheel and the screw. Moreover, when processing the tooth grooves of the screw and the profile of the two flanks of each star wheel tooth, the present invention facilitates adjusting tool positions, and simplifies a detection of dimensions of the tooth grooves of the screw and the star wheel teeth with higher accuracy.

These and other objectives, features, and advantages of the present invention will become apparent from the following detailed description, the accompanying drawings, and the appended claims.

BRIEF DESCRIPTION OF THE DRAWINGS

In FIG. 1: 101—housing, 102—star wheel, 103—exhausting port on housing, 104—rotor, 105—screw shaft, and 106—exhausting channel.

In FIG. 2: according to a rotation direction of the star wheel, a first meshing surface in the front of the star wheel tooth is called a front flank 109 and a second meshing surface in the back of the star wheel tooth is called a back flank 110.

In FIG. 6: 111—cylindrical milling cutter (equivalent to the base column); 112—cutter cover; 113—electromotor; and 114—oscillation center (namely a circle center of the star wheel).

DETAILED DESCRIPTION OF THE PREFERRED EMBODIMENT

The present invention is further illustrated with accompanying drawings and a preferred embodiment of the present invention.

Figure 3:
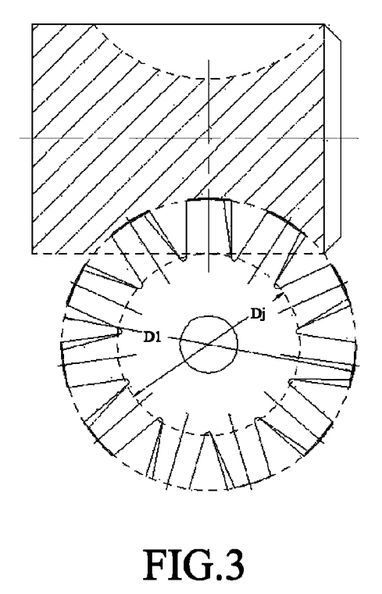
FIG. 3 is a geometrical sketch view of a root circle of the star wheel according to the preferred embodiment of the present invention.

Referring to FIG. 3, a root circle of a star wheel is a circle where meshing surfaces of star wheel teeth mesh with an external diameter of a screw, also called a pitch circle of the star wheel. The root circle of the star wheel has a diameter $D_j$ and a radius $r_g$. $D_1$ is a diameter of an addendum circle of the star wheel.

Figure 4:
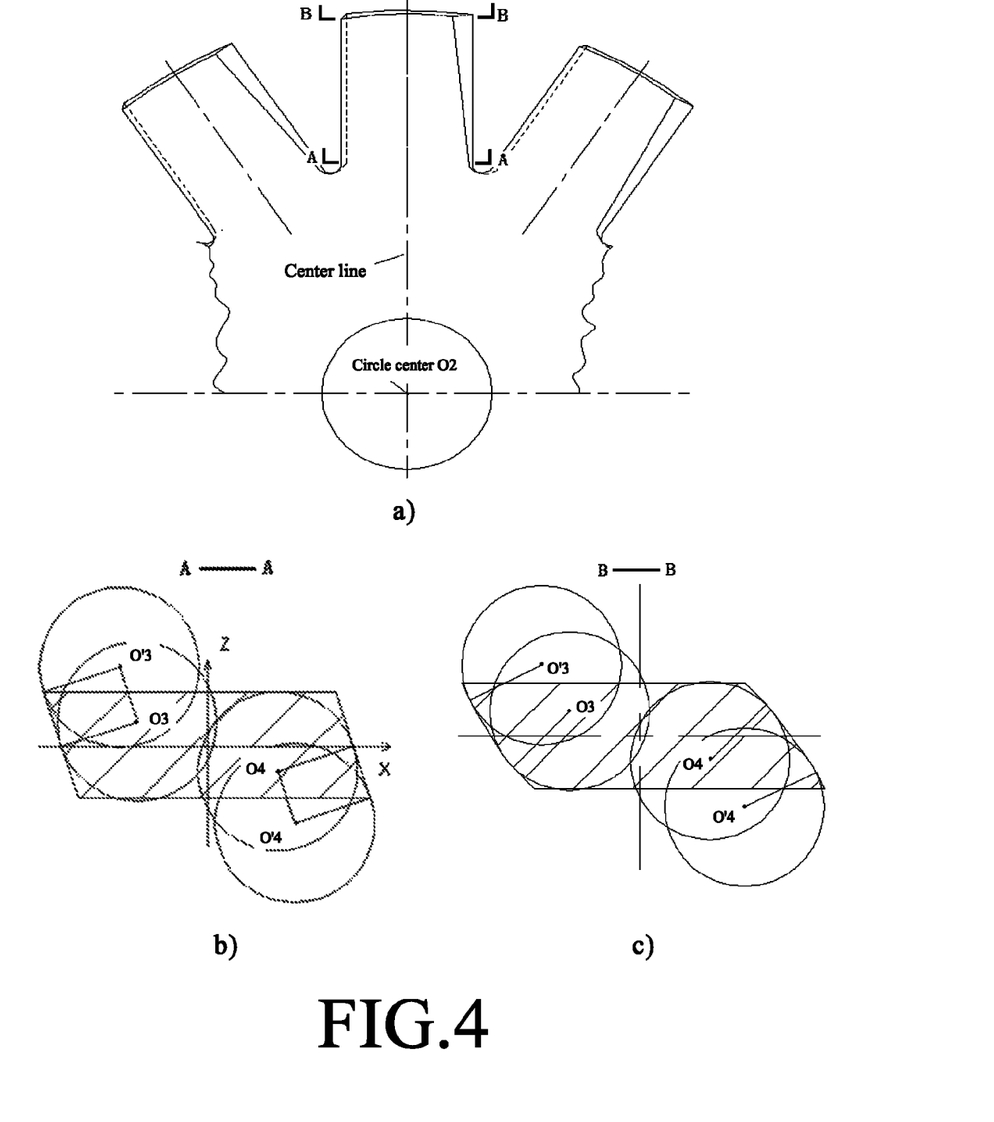
FIG. 4 is a geometrical sketch view of a center line of the star wheel tooth and base columns which are envelope-milled, represented on the star wheel tooth, according to the preferred embodiment of the present invention, wherein: a) is a sketch view of the center line of the star wheel tooth; b) is a sketch view of a projection relationship of centers of the base columns on a section A-A of a tooth root; and c) is a sketch view of the projection relationship of the centers of the base columns on a section B-B of a tooth top.

Referring to FIG. 4(a), a front flank 109 and a back flank 110 of the star wheel tooth respectively have a first intersection and a second intersection with the root circle on a central thickness surface of a star wheel sheet. A ray is drawn from a circle center of the star wheel sheet through a midpoint of a connecting line between the first and second intersections. The ray is a center line of the star wheel tooth.

In FIG. 4(b) and FIG. 4(c), portions of surfaces of two base columns $O_3$ and $O_4$ are used to construct portions of the front flank 109 and the back flank 110 of the star wheel tooth. Axes of the base columns $O_3$ and $O_4$ are parallel with the center line of the star wheel tooth. The base columns $O_3$ and $O_4$ are respectively represented on a section A-A (as showed in FIG. 4(b)) of a tooth root and a section B-B (as showed in FIG. 4(c)) of a tooth top of the star wheel tooth. According to a screw-star-wheel meshing and envelope principle, the base columns $O_3$ and $O_4$ are equivalent to a cylindrical milling cutter 111 (as showed in FIG. 6) for processing a corresponding tooth groove of the screw under a certain direction. The base columns $O_3$ and $O_4$ usually have the same diameter $d_0$. A value of $d_0$ depends on the diameter $D_1$ of the star wheel as follows.

TABLE 1

| | Diameter $D_1$ of star wheel, mm | | | | |
| --- | --- | --- | --- | --- | --- |
| | 80-120 | 121-150 | 151-200 | 201-280 | 280-400 |
| | Diameter $d_0$ of base columns, mm | | | | |
| | 10-12 | 12-14 | 14-16 | 16-18 | 18-20 |
| Horizontal inclined angle of first connecting line between axis centers of $O_3$' and $O_3$ | 46° | 45° | 44° | 43° | 42° |
| Horizontal inclined angle of second connecting line between axis centers of $O_4$' and $O_4$ | 61° | 60° | 59° | 58° | 57° |

In the FIG. 4(c), on a projection of the section B-B of the tooth top of the star wheel tooth, a local cylindrical projection of a first base column $O_3$ is tangent to a lower part of a projection of the front flank 109 and a local cylindrical projection of a second base column $O_4$ is tangent to an upper part of a projection of the back flank 110. A front sub-column $O_3$', having the same diameter with the first base column $O_3$, is provided above the first base column $O_3$, so as to further represent a construction feature of the front flank 109. A local cylindrical projection of the front sub-column $O_3$' is tangent to an upper part of the projection of the front flank 109. A horizontal inclined angle of a first connecting line between axis centers of the front sub-column $O_3'$ and the first base column $O_3$ is 42°-47°. A back sub-column $O_4'$, having the same diameter with the second base column $O_4$, is provided below the second base column $O_4$, so as to further represent a construction feature of the back flank 110. A local cylindrical projection of the back sub-column $O_4'$ is tangent to a lower part of the projection of the back flank 110 of the star wheel tooth. A horizontal inclined angle of a second connecting line between axis centers of the back sub-column $O_4'$ and the second base column $O_4$ is 56°-61°.

In the Fig.4(b), on a projection of the section A-A of the tooth root of the star wheel tooth, a cylindrical projection of the front sub-column $O_3'$ merely has a first point overlapping with an uppermost end of the projection of the front flank 109 of the star wheel tooth; a cylindrical projection of the back sub-column $O_4'$ merely has a second point overlapping with a lowermost end of the projection of the back flank 110 of the star wheel tooth.

Figure 5:
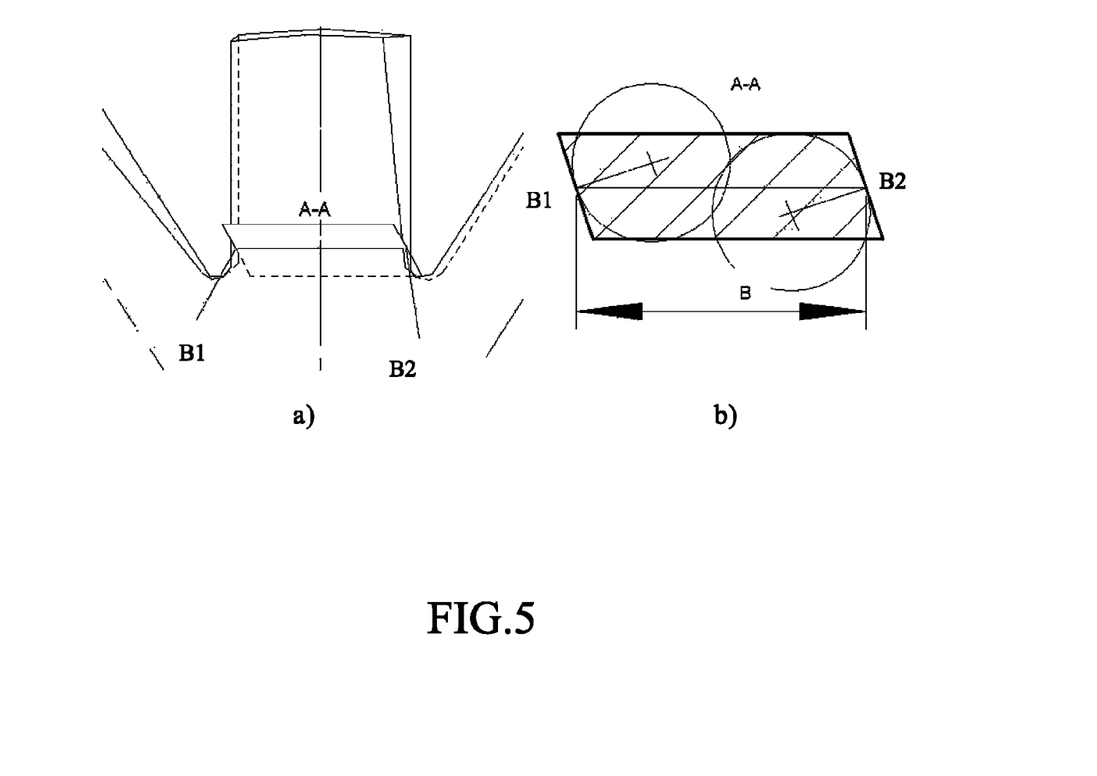
FIG. 5 is a geometrical sketch view of a tooth width of the star wheel according to the preferred embodiment of the present invention, wherein: a) is a sketch view of a position of the section A-A, wherein $B_1$ is an intersection on the front flank of the star wheel tooth and $B_2$ is an intersection on the back flank of the star wheel tooth; and b) is a sketch view of the tooth width B of the star wheel on the section A-A of the tooth root.

Referring to FIG. 5, an imaginary plane (namely the section A-A of the root circle) is drawn, through the center line of the star wheel tooth, vertically to an axis of the star wheel. The imaginary plane intersects with the front flank 109 and the back flank 110 of the star wheel tooth. Particularly, the imaginary place intersects with the flanks 109 and 110 at the pitch circle of the star wheel, respectively a third intersection $B_1$ and a fourth intersection $B_2$ (as showed in FIG. 5). A distance between the third and fourth intersections, $B_1$ and $B_2$, is defined as a tooth width B of the star wheel. Inclined angles of the front flank 109 and the back flank 110 of the star wheel tooth with the imaginary plane at the pitch circle are both $\lambda$. A conventional tooth number ratio of the screw to the star wheel is 6/11, and therefore, a value of $\lambda$ is represented as:

$$\tan \lambda = \frac{11D}{6D_j},$$

wherein: D—a diameter of the screw, mm; and $D_j$—the diameter of the pitch circle of the star wheel, mm.

Figure 6:
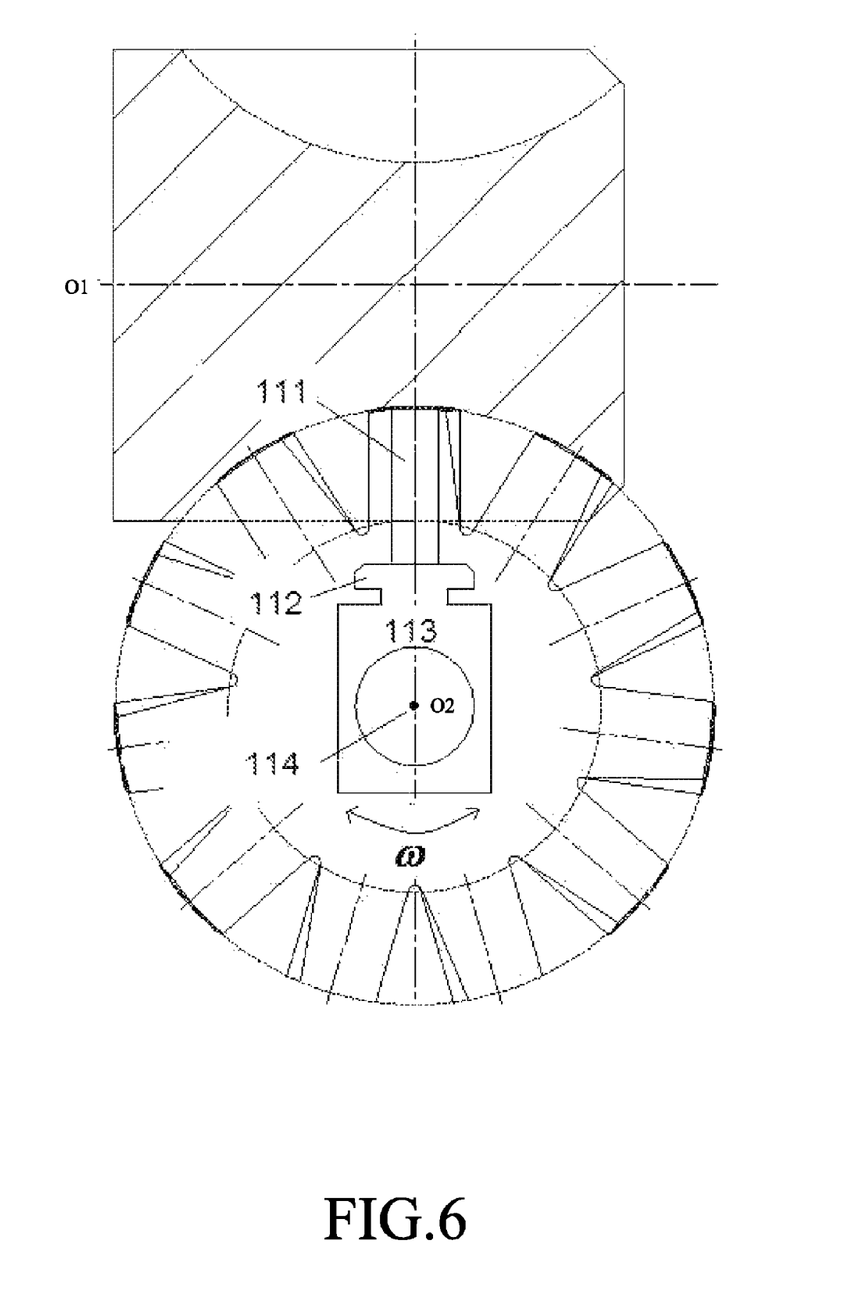
FIG. 6 is a sketch view of relative geometrical positions of a center of a planar circular oscillation of an axis of a cylindrical milling cutter and a screw being processed, according to the preferred embodiment of the present invention.

Referring to FIG. 6, the present invention is further illustrated by the following processing processes.

(1) Collaborative Construction and Processing of Profile of Front and Back Sides of Tooth Groove of Screw Firstly, a screw rotor processing milling machine is produced according to technologies of a Chinese patent application, CN 200810150033.9, milling machine for processing rotor of single-screw compressor. The screw to be processed is mounted on a workpiece shaft. According to the diameter of the star wheel as showed in Table 1, the diameter of the base column is determined. The base column is the cylindrical milling cutter 111 for envelope-processing the tooth groove of the screw. The chosen cylindrical milling cutter 111 is clamped in a cutter cover 112 of the milling machine specialized for the screw. A center of a planar circular oscillation of an axis of the cylindrical milling cutter 111 is a rotary center $O_2$ of the axis of the star wheel. The axis of the cylindrical milling cutter 111 is firstly adjusted to vertically intersect with an axis of the screw to be processed. A relative position between surfaces of the star wheel and the axis of the screw is given in designing a structure of the single-screw compressor. The cylindrical milling cutter 111 is then adjusted to a position overlapping with a center of the first base column $O_3$ of the front flank 109. After finishing milling sides of six tooth grooves of the screw, a central axis of the cylindrical milling cutter 111 is adjusted to a center of the second base column $O_4$ of the back flank 110 of the star wheel tooth. Surfaces of a back side of each tooth groove of the screw are milled through feeding the cylindrical milling cutter 111 axially.

(2) Construction and Implementation of Profile of Front and Back Flanks of Star Wheel Tooth According to a Chinese patent application, CN200610042414.1, Method for constructing profile of multi-column milling envelope tooth flanks of single-screw compressor, a specialized grinding machine for processing the flanks of the star wheel tooth is produced. A grinding wheel of the grinding machine is a disk grinding wheel. The disk grinding wheel is able to rotate around a central axis thereof for cutting. Moreover, a disk surface of the disk grinding wheel is able to revolve around an axis X which is parallel with the disk surface. The axis X is within the disk surface or out of the disk surface. When a star wheel piece is mounted on a workpiece desk for processing, the axis X actually is the axis center of the base column (the cylindrical milling cutter 111 at a base position). When collaboratively processing the two flanks of the star wheel tooth, the star wheel is firstly rotated; the center line of the star wheel tooth to be processed is provided as being collinear with the axis X; and then, the axis X is relatively moved to a position of the axis center of the first base column $O_3$ of the front flank 109 of the star wheel tooth.

As mentioned above, a lateral edge of the cylindrical milling cutter 111 and a cutter rest which the lateral edge revolves around are imaged as an operation process of the flanks of the star wheel tooth. The imaginary plane is drawn, through the center line of the star wheel tooth, vertically to the axis of the star wheel. The imaginary plane intersects with the front flank 109 and the back flank 110. The tooth width B of the star wheel is determined as showed in FIG. 5. As showed in FIG. 4, positions and shapes of the front flank 109 and the back flank 110 of the star wheel tooth are represented geometrically by the two base columns, $O_3$ and $O_4$, having the parallel axes and the same diameter. The axes of the base columns $O_3$ and $O_4$ are parallel with the center line of the star wheel tooth. The tooth width B, a center distance L between the two base columns $O_3$ and $O_4$, a diameter $d_0$ of the base columns $O_3$ and $O_4$, and an inclined angle $\lambda$ of the flanks of the star wheel tooth at the pitch circle of the star wheel has relationships of:

$$B = d_0 \sin \lambda + L \cos \gamma; \text{ and}$$

$$\gamma = \arcsin\left(\frac{d_0}{L} \cos\lambda\right),$$

wherein: $\gamma$ is a horizontal inclined angle of the center distance L between the two base columns $O_3$ and $O_4$.

While feeding the star wheel relatively radially, an oscillation angle of a disk milling cutter is adjusted, in such a manner that the front flank 109 of the star wheel tooth is processed into a portion of an envelope surface of the first base column $O_3$. Then the axis X is relatively moved to the position of the axis center of the second base column $O_4$ of the back flank 110 of the star wheel tooth. While feeding the star wheel relatively radially, the oscillation angle of the disk milling cutter is adjusted, in such a manner that the back flank 110 of the star wheel tooth is processed into a portion of an envelope surface of the second base column $O_4$.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for collaboratively constructing a column envelope profile of two flanks (109, 110) of a star wheel tooth, comprising steps of:

determining a tooth width B of the star wheel tooth according to a diameter of a star wheel (102) and a dimension of a root circle; and thereafter, geometrically representing positions and shapes of a front flank (109) and a back flank (110) of the star wheel tooth of the star wheel by two base columns having parallel axes and a same diameter; wherein:

the diameter of the two base columns is determined according to the diameter of the star wheel, and the base columns are embodied as a cylindrical milling cutter (111);

the axes of the two base columns are parallel with a center line of the star wheel tooth;

the tooth width B, a center distance L of the two base columns, the diameter $d_0$ of the two base columns and an inclined angle $\lambda$ of the flanks (109, 110) of the star wheel tooth at a pitch circle of the star wheel have relationships of:

$$B = d_0 \sin \lambda + L \cos \gamma; \text{ and}$$

$$\gamma = \arcsin\left(\frac{d_0}{L} \cos\lambda\right),$$

wherein $\gamma$ is a horizontal inclined angle of the center distance L of the two base columns; and on a section of a tooth top of the star wheel tooth, a local projection of a first base column ($O_3$) which is close to the front flank (109) of the star wheel tooth is on a lowermost part of a projection of the front flank (109) of the star wheel tooth; a local projection of a second base column ($O_4$) which is close to the back flank (110) of the star wheel tooth is on an uppermost part of a projection of the back flank (110) of the star wheel tooth;

selecting a screw rotor processing milling machine, and mounting a screw to be processed on a shaft;

clamping a chosen cylindrical milling cutter (111), for envelop-processing tooth grooves of the screw, in a cutter cover (112) of the milling machine, wherein: a center of a planar circular oscillation of an axis of the cylindrical milling cutter (111) is a rotary center ($O_2$) of an axis of the star wheel;

adjusting the cylindrical milling cutter (111) to a position overlapping with a center of the first base column ($O_3$) of the front flank (109), and finishing milling a surface of a front side of each tooth groove of the screw;

adjusting the cylindrical milling cutter (111) to a position overlapping with a center of the second base column ($O_4$) of the back flank (110), and finishing milling a surface of a back side of each tooth groove of the screw;

finishing machining of a profile of the front and back sides of the tooth grooves of the screw;

selecting a grinding machine for processing the flanks (109, 110) of the star wheel tooth, wherein the grinding machine comprises a grinding wheel which is a disk grinding wheel; the disk grinding wheel is able to rotate around a central axis thereof for cutting; and a disk surface of the disk grinding wheel is able to revolve around an axis X which is parallel with the disk surface;

mounting the star wheel on a desk of the grinding machine, and enabling the star wheel to rotate;

enabling the center line of the star wheel tooth to be processed to be collinear with the axis X, and then relatively moving the axis X to the center of the first base column ($O_3$) of the front flank (109) of the star wheel tooth;

feeding the star wheel relatively radially, meanwhile adjusting an oscillation angle of a disk milling cutter, and processing an envelope surface of the front flank (109) of the star wheel tooth into a portion of an envelope surface of the first base column ($O_3$);

feeding the star wheel relatively radially, meanwhile adjusting the oscillation angle of the disk milling cutter, and processing an envelope surface of the back flank (110) of the star wheel tooth into a portion of an envelope surface of the second base column ($O_4$); and finishing constructing the profile of the front and back flanks (109, 110) of the star wheel tooth.

2. The method for collaboratively constructing the column envelope profile of the two flanks (109, 110) of the star wheel tooth, as recited in claim 1, further comprising a step of: providing a front sub-column having the same diameter with the base columns above the first base column which is close to the front flank (109) of the star wheel tooth, so as to further represent a construction feature of the front flank (109) of the star wheel tooth, wherein a local projection of the front sub-column is on an upper part of the projection of the front flank (109) of the star wheel tooth; and a horizontal inclined angle of a first connecting line between axis centers of the front sub-column and the first base column is 42°-47°.

3. The method for collaboratively constructing the column envelope profile of the two flanks (109, 110) of the star wheel tooth, as recited in claim 2, wherein: on a section of a tooth root of the star wheel tooth, the local projection of the front sub-column merely has a first point overlapping with an uppermost end of the projection of the front flank (109) of the star wheel tooth.

4. The method for collaboratively constructing the column envelope profile of the two flanks (109, 110) of the star wheel tooth, as recited in claim 1, further comprising a step of: providing a back sub-column having the same diameter with the base columns below the second base column which is close to the back flank (110) of the star wheel tooth, so as to further represent a construction feature of the back flank (110) of the star wheel tooth, wherein a local projection of the back sub-column is on a lower part of the projection of the back flank (110) of the star wheel tooth; and a horizontal inclined angle of a second connecting line between axis centers of the back sub-column and the second base column is 56°-61°.

5. The method for collaboratively constructing the column envelope profile of the two flanks (109, 110) of the star wheel tooth, as recited in claim 4, wherein: on a section of a tooth root, the local projection of the back sub-column merely has a second point overlapping with a lowermost end of the projection of the back flank (110) of the star wheel tooth.

* * * * *